United States Patent [19]

Wunderlich

[11] Patent Number: 4,476,385
[45] Date of Patent: Oct. 9, 1984

[54] UTILIZING GAMMA CAMERAS FOR UPTAKE STUDIES

[76] Inventor: Alan M. Wunderlich, Pringle Rd., Miller Place, N.Y. 11764

[21] Appl. No.: 413,767

[22] Filed: Sep. 1, 1982

Related U.S. Application Data

[62] Division of Ser. No. 097,168, Nov. 26, 1979, Pat. No. 4,348,591.

[51] Int. Cl.³ ............................................. G01T 1/164
[52] U.S. Cl. ................................. 250/303; 250/362; 250/363 S; 250/505.1
[58] Field of Search ............ 250/303, 362, 366, 505.1, 250/515.1, 363 R

[56] References Cited

U.S. PATENT DOCUMENTS

| | | | |
|---|---|---|---|
| 3,040,175 | 6/1962 | Kern | 250/71.5 |
| 3,412,246 | 11/1968 | Horwitz et al. | 250/83.6 |
| 3,591,808 | 7/1971 | Prag | 250/71.5 |
| 3,748,470 | 7/1973 | Barrett | 250/363 |
| 3,814,938 | 6/1974 | Martone et al. | 250/366 |
| 3,936,646 | 2/1976 | Jonker | 250/509 |
| 3,986,036 | 10/1976 | Harper et al. | 250/515.1 |
| 4,048,498 | 9/1977 | Gerlach et al. | 250/305 |
| 4,068,126 | 1/1978 | Wilson | 250/363 S |
| 4,118,632 | 10/1978 | Luig | 250/513 |
| 4,281,382 | 7/1981 | Knoll et al. | 250/363 S |
| 4,377,752 | 3/1983 | Sano et al. | 250/505.1 |

OTHER PUBLICATIONS

Fleming, "A Technique for the Absolute Measurement of Activity Using a Gamma Camera and Computer", Phy. Med. Biol., 24(1), Jan. 1979, pp. 176–180.

Carley, "A Device for Vertex Imaging", J. Nuc. Med. Tech., 3(3), 1975, pp. 170–171.

Primary Examiner—Alfred E. Smith
Assistant Examiner—Carolyn E. Fields
Attorney, Agent, or Firm—F. Eugene Davis, IV

[57] ABSTRACT

A generally cylindrical radiation shielding adapter makes possible the efficient utilization of a gamma camera for uptake studies. Only a small portion of the camera's field of view is utilized, thus increasing the count rate and decreasing the length of the study and the amount of radioactive material required to be absorbed by the organ.

An alternative flat field of view straight bore masking collimator is also provided for uptake studies.

7 Claims, 6 Drawing Figures

UTILIZING GAMMA CAMERAS FOR UPTAKE STUDIES

This application is a division of application Ser. No. 097,168, filed Nov. 26, 1979, now U.S. Pat. No. 4,348,591.

TECHNICAL FIELD

This invention relates to utilizing gamma cameras for uptake studies and restricted fields of view and multiple aperture collimator systems therefor. More particularly it relates to gamma camers of the Anger type as originally disclosed in U.S. Pat. No. 3,011,057 issued to H. O. Anger on Nov. 28, 1961.

In these cameras a plurality of light detectors, usually nineteen or more photo multipliers, are located behind a crystal which scintillates, that is, produces pinpoints of light when certain atoms in the crystal are struck by very high energy X-rays called gamma rays emitted from radioactive atoms. The radioactive atoms are taken up by selected organs to be examined and thus images of the organ may be recorded.

The signals from the detectors are combined in complex electronic circuitry and the position of each light scintillation is calculated and the intensity of the scintillation is also calculated. This intensity and position is then displayed on a cathode ray tube and may be recorded on photographic film. While the apparatus is detecting the location and intensity of a single scintillation, other scintillations occurring will be disregarded. Thus, many gamma rays or particles reaching a gamma camera are disregarded.

BACKGROUND ART

Gamma cameras according to the prior art are provided with collimators comprised of several inches of lead, having a plurality of usually parallel channels therethrough, thus limiting the field of view to parallel gamma rays or gamma rays emitted over a very small angular cone.

However, in certain instances, according to the prior art, the channels through the lead collimator are conically aligned so that rays emitted from a relatively close point source may be imaged throughout the entire face of the scintillating crystal. This is shown, for example, in U.S. Pat. No. 4,068,126 issued Jan. 10, 1978 to D. T. Wilson.

Gamma cameras, as previously stated, are utilized to image organs which have taken up radioactive material. Another very common form of radiographic study used in the prior art is called an uptake. In an uptake, radioactive material is given to the patient and is taken up by a selected organ. The amount of radioactive material taken up may be indicative of a disease process. Thus, at a predetermined time after the patient has taken the radioactive material, according to the prior art, the organ is exposed to a single scintillation detector which merely counts the total number of gamma rays produced. The total number of counts received by the scanner indicates the amount of radioactive uptake.

Although gamma cameras are provided with counters, they cannot be practically employed for uptakes since the amount of time required for the uptake study would be very large, due to the fact that the gamma camera cannot count every gamma ray or gamma particle reaching the scintillating material, as previously described. Furthermore, at high count rates the counts registered by a gamma camera are not proportional to the actual counts received.

I have discovered that gamma cameras may be very successfully employed for uptake studies, such as thyroid studies, by masking or shielding off the greater portion of the gamma camera and providing the remaining central portion with a generally cylindrical open collimator. Most conveniently this flat field collimator may be provided as an adapter for conical collimators supporting pinholes which are also utilized by gamma cameras.

Additional collimators can also be provided according to my invention. For example, another adapter collimator interfitting to the conical pinhole supporting collimator, may be a restricted field lead cylinder having a plurality of parallel channels therethrough. This collimator may be used for small organ gamma studies and due to the great length of the passageways increases the gamma camera's resolutioin as disclosed in U.S. Pat. No. 4,118,632, issued Oct. 3, 1978 to Heribert Luig.

In another embodiment of the invention the adapter may be provided with long channels which diverge from the organ to the scintillating crystal to provide an image magnification.

In another alternative embodiment the flat field straight bore collimator may be a separate collimator rather than an adapter for use with a pinhole collimator.

OBJECTS OF THE INVENTION

It is therefore a principal object of the invention to provide a method and apparatus for utilizing gamma cameras for uptake studies.

Another principal object of the invention is to provide methods and apparatus for utilizing gamma cameras for restricted fields of view.

Still another principal object of the invention is to provide multiple aperture collimator systems providing the above objects.

A still further object of the invention is to provide such multiple aperture collimator systems providing for a pinhole collimator.

Yet another object of the invention is to provide such multiple aperture collimator systems providing for small organ studies of enhanced resolution.

A yet further object of the invention is to provide such multiple aperture collimator systems providing for enlarged images of small organs.

Other objects of the invention will in part be obvious and will in part appear hereinafter.

The invention accordingly comprises the several steps in the relation of one or more such steps with respect to each of the others thereof, which will be exemplified in the methods hereinafter disclosed and articles of manufacture possessing the features, properties, and the relation of elements which will be exemplified in the articles hereinafter described. The scope of the invention will be indicated in the claims.

THE DRAWINGS

For a fuller understanding of the nature and objects of the invention reference should be had to the following detailed description taken in connection with the accompanying drawings in which.

The same reference numbers refer to the same elements throughout the several views of the drawings.

BEST MODE FOR CARRYING OUT THE INVENTION

Figure 1:
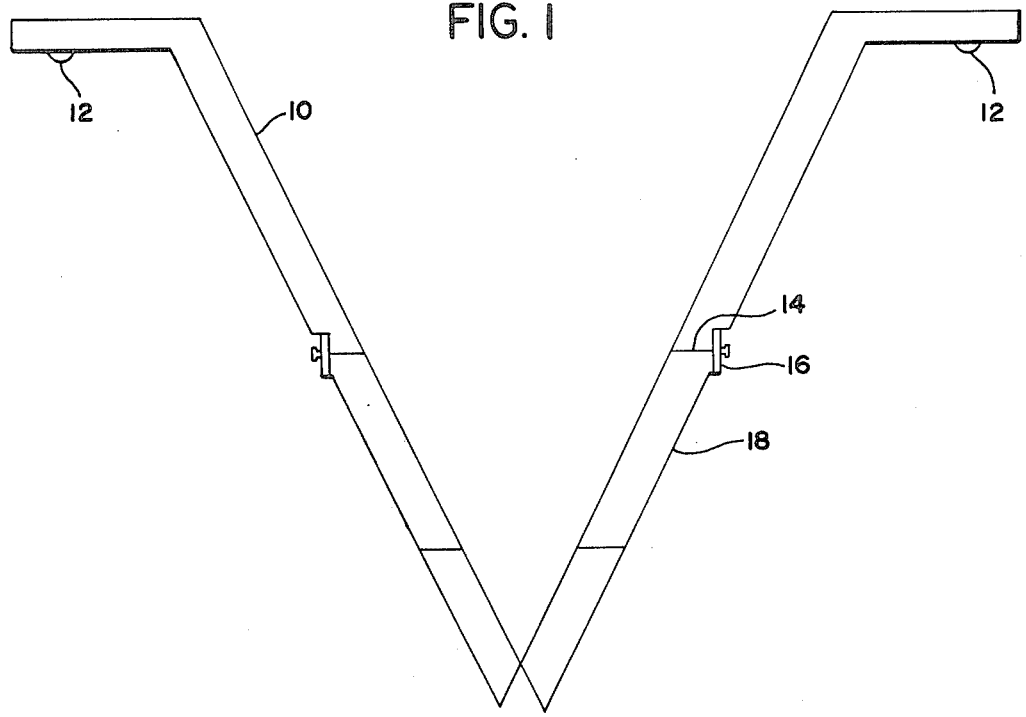
FIG. 1 is a diagrammatic cross sectional view of the adapter of the invention with a pinhole collimator mounted thereto.

Now referring to FIG. 1. A multiple aperture collimator adapter 10 according to the invention is mounted to the front face of a gamma camera (not shown) by means of fasteners 12. The adapter 10 is substituted for the normal multi-holed collimator supplied with the camera, such as shown in U.S. Pat. No. 3,814,938, issued June 4, 1974 to R. J. Martone et al. The adapter 10 may conveniently be of the same size and shape as the lower portion of the cone of prior art pinhole collimators. That is, the top opening of the cone at the face of the gamma camera may be 14.7 inches and the adapter 10 may be in the form of a multi-walled structure of aluminum or steel for structural support with one or more layers of lead for shielding attached thereto. Approximately six and one-half inches away from the face of the gamma camera the cone is truncated at 14 and supplied with a locking device generally indicated at 16 for locking the remainder of the cone 18 and an interchangeable pinhole generally indicated at 20. The opening across truncated end 14 is six inches in diameter but may be as small as about three inches in diameter.

Figure 2:
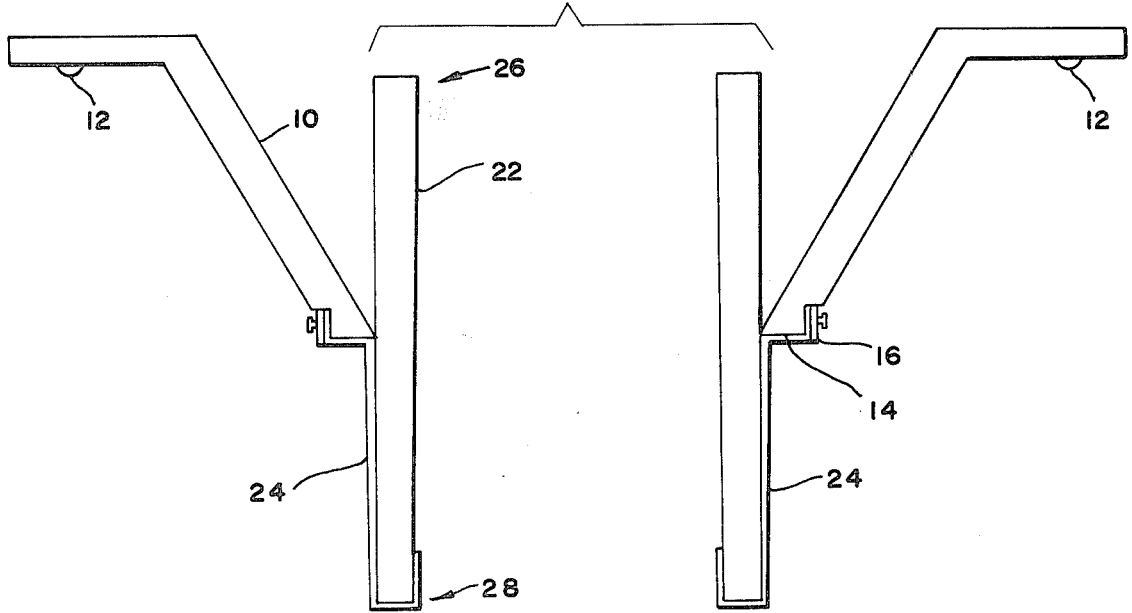
FIG. 2 is a diagrammatic cross sectional view of the adapter of FIG. 1 with a flat field collimator for uptake studies mounted thereto.

Now referring to FIG. 2. The pinhole supporting portion of the cone 18 may be removed and a generally cylindrical collimator 22, preferably a right circular cylinder, may be mounted to the adapter 10 by means of the locking device 16. The cylinder 22 may be of lead or a multi-element structure similar to the cones of the prior art and may be provided with additional support means generally indicated at 24.

The walls of the cylinder 22 are preferably thicker at the end 26 near the gamma camera than at the outer end 28. This is because the outer end 28 mainly serves to prevent stray radiation from around the patient from getting to the scintillation crystal, whereas the inner walls 26 prevent oblique rays from the radiating organ from reaching the outer portions of the gamma camera.

Those skilled in the art will realize that by masking off the larger portion of the gamma camera (preferably for tyroid uptake studies the cylinder 22 has an inner diameter of approximately three inches) nearly all of the gamma rays from the patient reaching the central area of the gamma camera will be counted and the gamma camera will not be overloaded with counts. As previously stated this is because the outer portions of the gamma camera crystal will not be producing scintillations which would have to be processed by the camera.

The walls of the cylinder 22 are approximately one-half inch thick, thus the outside diameter of the cylinder 22 is approximately four inches and the opening in the outer end 14 of the adapter 10 must be at least this diameter. The smallest practical dimension for the inner diameter (or largest inner dimension, if collimator 26 is not circularly symmetrical) is approximately two inches due to the size of the organs studied. Thus the smallest practical inner diameter (or largest dimension) of the opening in the outer end of the adapter 10 is three inches and this distinguishes the adapter 10 from the pinhole collimators of the prior art which have much smaller openings for multiple pinholes.

Thus the length of the cylinder 22 is substantially greater than its inner diameter as shown in FIG. 2.

Figure 3:
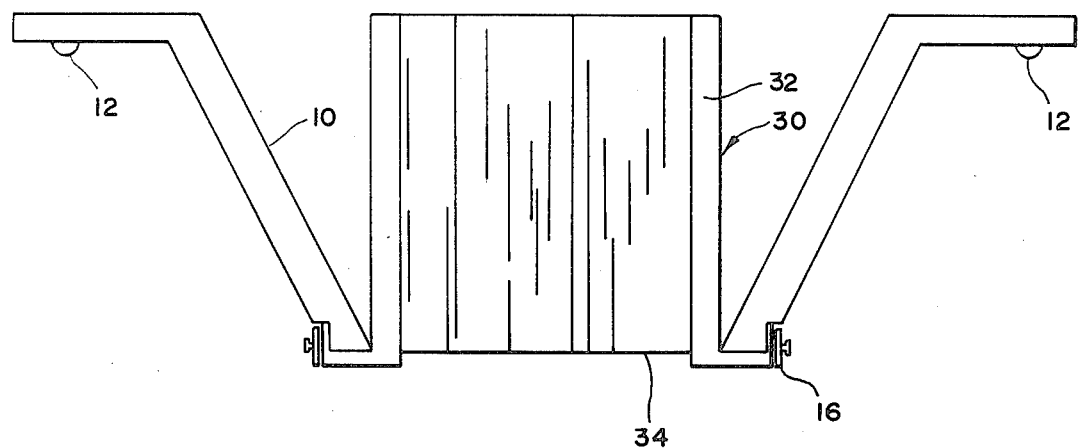
FIG. 3 is a diagrammatic cross sectional view of the adapter of FIG. 1 with a small organ collimator mounted thereto.

Referring to FIG. 3. A straight ultrafine collimator generally indicated at 30 is shown mounted to the adapter 10. The collimator comprises a support structure 32 which is held to the adapter by means of the locking ring 16. Inside the support structure 32 is a straight ultrafine collimator 34 formed of lead having a plurality of fine parallel channels therethrough. As previously explained the straight ultrafine collimator 30 may be utilized for small organ studies such as heart studies of increased resolution.

Figure 4:
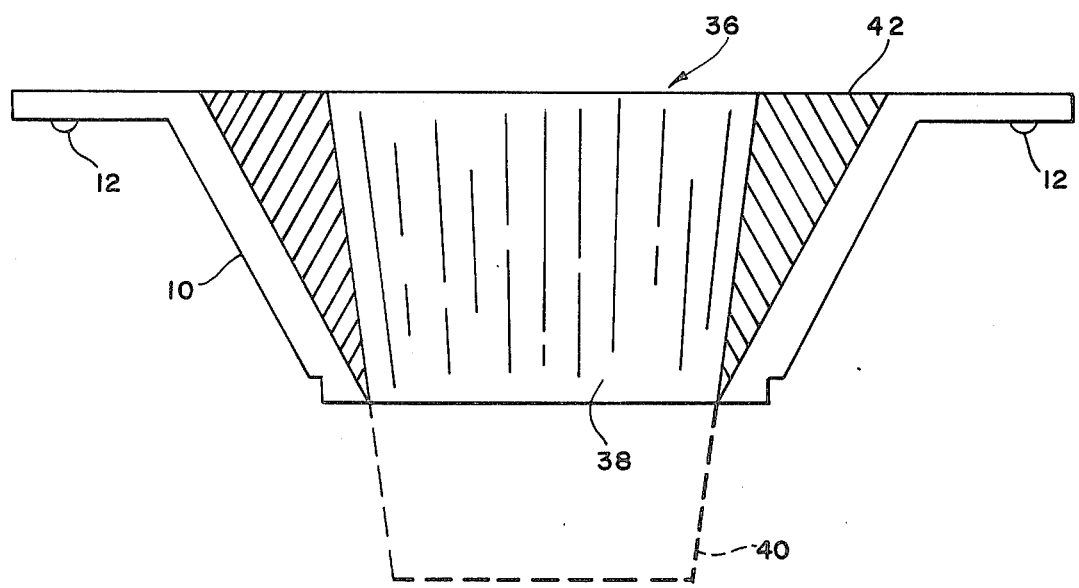
FIG. 4 is a diagrammatic cross sectional view of the adapter of FIG. 1 with an enlarging small organ collimator mounted therein.

Referring to FIG. 4. A converging collimator generally indicated at 36 may be top loaded into adapter 10 as shown. It comprises the lead collimator 38 having a plurality of conically diverging channels therethrough which provide an enlarged image of image plane 40 on the scintillating crystal of the Gamma camera. The collimator itself 38 is surrounded by a light filler material forming part of the collimator insert 36.

Figure 5:
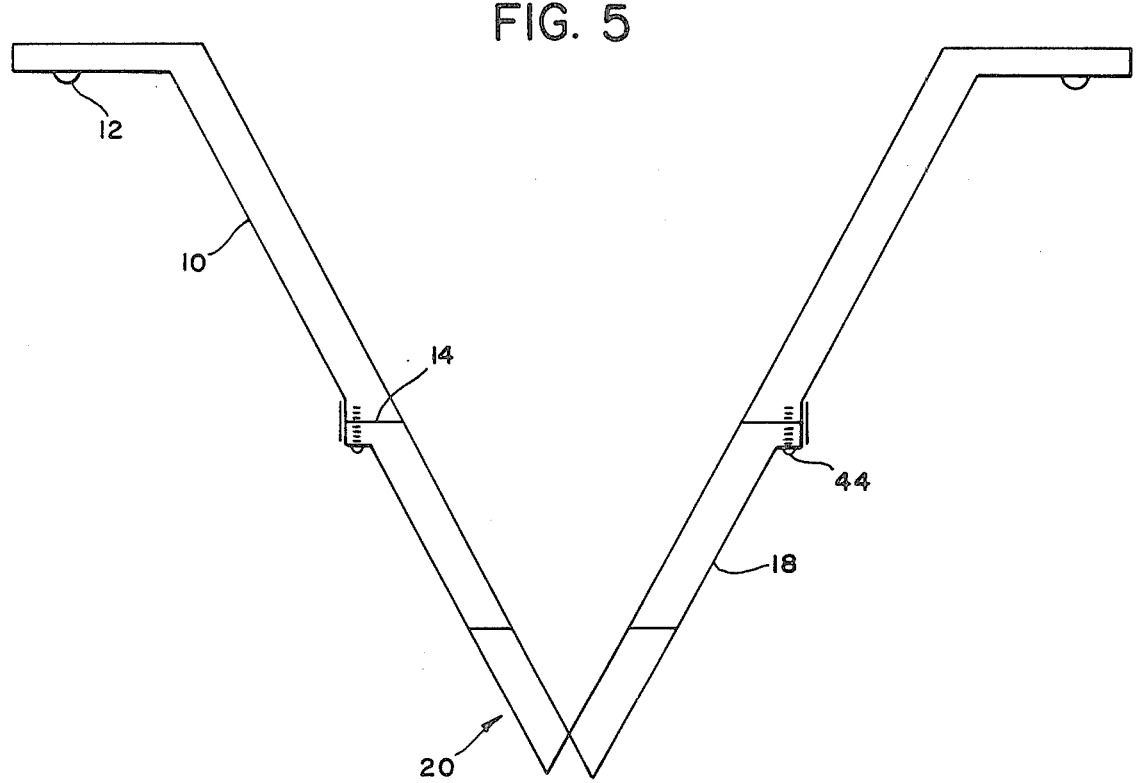
FIG. 5 is a diagrammatic cross sectional view of an alternative adapter according to the invention having a pinhole collimator mounted thereto.

In FIG. 5 there is shown an alternative method of mounting principle supporting truncated cone 18 to adapter 10. This means comprises fasteners 44 which conveniently may be spring loaded locking pins which must be pushed or pulled and rotated to lock or unlock the sections 10 and 18.

Figure 6:
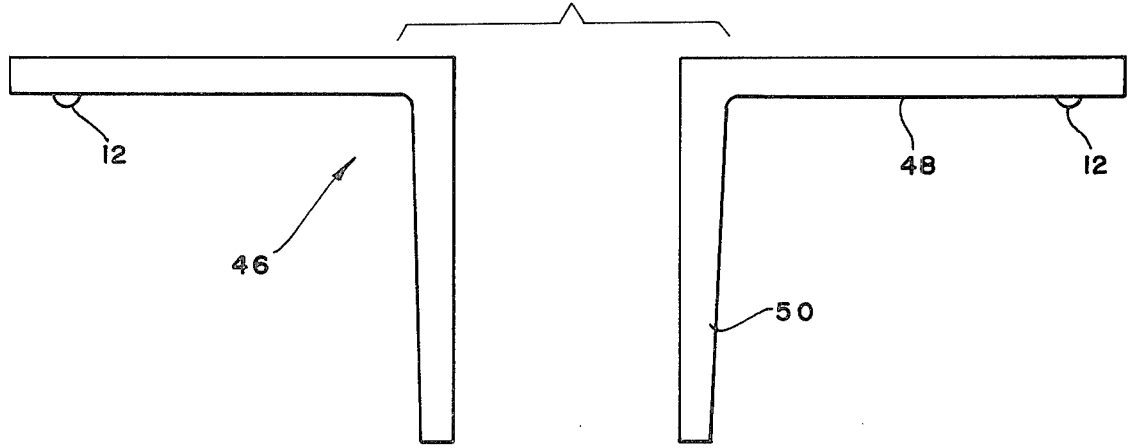
FIG. 6 is a diagramatic cross sectional view of an alternative form of flat field collimator according to the invention.

Now referring to FIG. 6. There is shown an alternative form of straight bore flat field, or uptake, collimator generally indicated at 46. This comprises a flat plate portion 48 and an upstanding right cylindrical portion 50 both formed of radiation shielding material mounted to the gamma camera by means of fasteners 12 in the same way that adapter 10 is mounted.

The smallest practical dimension for the inner diameter of cylinder 50 is two inches as previously explained. The largest practical inner diameter is about five inches (the wall thickness being one-half inch) as increasing the opening exposes the camera to more and more background radiation and the camera cannot correctly process these counts.

It will thus be seen that the objects set forth above among those made apparent from the preceding description are efficiently attained and since certain changes may be made in carrying out the above methods and articles without departing from the scope of the invention it is intended that all matter contained in the above description or shown in the accompanying drawings shall be interpreted as illustrative and not in a limiting sense.

It is also to be understood that the following claims are intended to cover all of the generic and specific features of the invention herein described and all of the statements of the scope of the invention which as a matter of language might be said to fall therebetween.

Having described my invention what I claim as new and desire to secure by Letters Patent is:

1. The method of performing uptake studies with a multiple detector imaging gamma camera comprising masking off the greater portion of the gamma camera's multiple detectors with a radiation shield to provide an aperture having a greatest dimension substantially between two and five inches.

2. The method of claim 1 wherein said aperture is in the central portion of said radiation shield.

3. The method of claim 2 wherein said aperture is circular.

4. The method of claims 1, 2, or 3, wherein said radiation shield has a single opening therein.

5. The method of claims 1, 2, or 3 wherein said aperture's greatest dimension is substantially three inches.

6. The method of claim 1 wherein said radiation shield has a single circular opening therein.

7. The method of claim 6 wherein said circular opening has a diameter of substantially three inches.

* * * * *